(12) United States Patent
Golden et al.

(10) Patent No.: US 8,831,975 B2
(45) Date of Patent: Sep. 9, 2014

(54) SYSTEM AND METHOD FOR SUBSCRIPTION-BASED DELIVERY SERVICE

(75) Inventors: Michael Golden, Ambler, PA (US); Michael Rubin, Bryn Mawr, PA (US)

(73) Assignee: Shoprunner, Inc., San Mateo, CA (US)

( * ) Notice: Subject to any disclaimer, the term of this patent is extended or adjusted under 35 U.S.C. 154(b) by 373 days.

(21) Appl. No.: 13/109,445

(22) Filed: May 17, 2011

(65) Prior Publication Data
US 2012/0084129 A1    Apr. 5, 2012

Related U.S. Application Data

(60) Provisional application No. 61/388,676, filed on Oct. 1, 2010.

(51) Int. Cl.
*G06Q 30/00* (2012.01)
*G06Q 30/02* (2012.01)

(52) U.S. Cl.
CPC ............ *G06Q 30/0222* (2013.01); *G06Q 30/00* (2013.01)
USPC ....................................................... 705/14.1

(58) Field of Classification Search
CPC ....................................................... G06Q 90/00
USPC ....................................................... 705/14.1
See application file for complete search history.

(56) References Cited

U.S. PATENT DOCUMENTS

| | | | |
|---|---|---|---|
| 5,960,411 | A | 9/1999 | Hartman et al. |
| 7,590,563 | B1 | 9/2009 | Ward et al. |
| 7,590,564 | B1 | 9/2009 | Ward et al. |
| 7,590,565 | B2 | 9/2009 | Ward et al. |
| 7,953,642 | B2 | 5/2011 | Dierks |
| 7,958,545 | B2 | 6/2011 | Chan et al. |
| 7,962,409 | B2 | 6/2011 | O'Leary et al. |
| 8,010,605 | B2 | 8/2011 | Chang |
| 2002/0188482 | A1* | 12/2002 | Friend .............................. 705/4 |
| 2008/0162284 | A1 | 7/2008 | Villano |

* cited by examiner

*Primary Examiner* — Daniel Lastra
(74) *Attorney, Agent, or Firm* — Morgan Lewis & Bockius LLP

(57) ABSTRACT

A subscription-based discounted delivery service that allows consumers to make purchases from multiple merchants through multiple sales channels. User preference information is stored by the service provider and provided to any of the multiple merchants from whom the user seeks to make a purchase, from the product detail page of such merchant, to be delivered using the discounted delivery service.

22 Claims, 34 Drawing Sheets

MERCHANT

Outlet | Gift Center | Group Sales | Baseball | Football | Basketball | Exercise | Golf | Fan Shop | Apparel | Footwear Home | Log-in | Track Order | Help Desk To place an order call 1-800-000-000

Search [ ] GO

☑ Sign up, get 10% off          🛒 Cart (0 items)

Unlimited FREE 2-DAY SHIPPING by ShopRunner.          Click here for a free 30-Day Trial.

All Departments
» Scooters
» Indoor Games
» Paintball / Airsoft
» Accessories
» Apparel
» View All [+]

Exercise Equipment
» Treadmills
» Elliptical Machines
» Home Gyms
» Bikes
» Bowflex Collection
» View All [+]

Games
» Indoor Games
» Outdoor Games
» Billiards
» Lawn Games
» Poker
» View All [+]

Apparel
» Men's Apparel
» Women's Apparel
» Kids' Apparel
» Hats
» Gloves
» View All [+]

Footwear
» Footwear Outlet
» Men's Footwear
» Women's Footwear
» Kids' Footwear
» Socks
» View All [+]

Electronics / Optics
» GPS & Navigation
» Cameras & Camcorders
» Cellular Phones & Accessories
» Audio & Video
» Optics
» View All [+]

Fan Shop-Pro/College
» NFL
» MLB
» NBA
» NHL
» NCAA
» View All [+]

Outdoor Recreation
» Backyard Living
» Boating / Marine
» Camping / Hiking
» Cycling
» Fishing
» View All [+]

Basketball
» Backboard Systems
» Basketballs
» Footwear
» Apparel
» Nets / Rims
» View All [+]

FIG. 2A

MERCHANT

Outlet | Gift Center | Group Sales

To place an order call 1-800-000-000

Home | Log-in | Track Order | Help Desk

Baseball | Basketball | Football | Exercise | Golf | Fan Shop | Apparel | Footwear Search [  ] GO ☑ Sign up, get 10% off!

🛒 Cart ( 0 items )

FITNESS/HEALTH

Home | Weight Training - Belts

Power Lifting Belt
Item no: 1998059

OUR PRICE: $54.99
LIST PRICE: $64.99

The 4 3/4-in nylon Power lifting belt offers an extra-firm design with reinforced neoprene. It features a unique downward angle that fits the natural shape of the back and hip and rib contours for extra comfort. It widens at the front for abdominal support and includes an dual closure system with a heavy-duty, stainless-steel slide bar buckle.

🚚 This item is eligible for FREE 2-Day Shipping
learn more

Color : Size
[Please select a color : size ▼]
Qty: [1]

[ADD TO CART]  [Add to Wish list]

☑ BillMe Later   BUY NOW! NO PAYMENTS FOR 90 DAYS on purchases over $250

AVAILABILITY: In stock, leaves warehouse in 1- 2 full bus. days. - (Details)

Remember, no sales tax except in CA, GA, KY, MA, NJ, NY, PA and VA.

🔍 LARGER IMAGE

Browse:
Belts

◄ 13 of 18 ►

Product Rating
☆☆☆☆☆ (0 Ratings)
Write a Review

Product Tools:
- Email A Friend

Related Categories
- Belts
- See all Schiek's Sports

MERCHANT

To place an order call 1-800-000-000   Search [    ] [GO]

Home | Log-in | Track Order | Help Desk   ✉ Sign up, get 10% off!   🛒 Cart ( 0 items )

Outlet | Gift Center | Group Sales | Baseball | Basketball | Football | Exercise | Golf | Fan Shop | Apparel | Footwear

SHOPPING CART

Why are some items not eligible for FREE 2-Day Shipping by ShopRunner? learn more  Members Sign Out.

YOUR SHOPPING CART   How does my Shopping Cart work?   View Your Wish List (Sign In)

| Qty. | Item Description | Price | Total |
|---|---|---|---|
| 1 | Home Gym | $2199.99 | $2199.99 |
| Move to Wish List | Item#: 2447120 | | |
| Remove from Shopping Cart | [Extended Service Contract ▼] 📋  IN STOCK  Leaves warehouse in 2-3 full bus. days. - (Details) | | |
| 1 | Game Basketball - New Low Price | $89.99 | $89.99 |
| Move to Wish List | Item#: 2674368  IN STOCK | | |
| Remove from Shopping Cart | Leaves warehouse in 1 - 2 full bus. days. - (Details)  🎁 Gift wrapping available (Details)  🛒 FREE 2-Day Shipping | | |
| 1 | Football | $24.99 | $24.99 |
| Move to Wish List | Item#: 2994288  IN STOCK | | |
| Remove from Shopping Cart | Leaves warehouse in 1 - 2 full bus. days. - (Details)  🎁 Gift wrapping available (Details)  🛒 FREE 2-Day Shipping | | |

[UPDATE CART]   Using a promotional code? [     ] [APPLY]

CONTINUE SHOPPING
- Home
- Previous Page
- NBA Official Basketballs
- Home Gyms
- Footballs - Youth Merchandise Subtotal: $ 2314.97
Estimated Shipping and Handling: $135.98
Based on ground shipping within continential U.S.
🛒 ShopRunner Shipping: $ 0.00
Sales Tax: $0.00
Remember, no sales tax except in CA, GA, KY, MA, NJ, NY, PA and VA

Estimated Total: $2320.96

[PROCEED TO SECURE CHECKOUT]

FIG. 2M

MERCHANT
To place an order call 1-800-000-000
Search [____] [GO]
Home | Log-in | Track Order | Help Desk    ✉ Sign up, get 10% off!    🛒 Cart ( 0 items )
Outlet | Gift Center | Group Sales | Baseball | Basketball | Football | Exercise | Golf | Fan Shop | Apparel | Footwear

CHECKOUT

| Addresses » | Shipping » | Payments » | Review » | Receipt |

Items in your cart qualify for FREE 2-Day Shipping by ShopRunner. Click here for a free 30-Day Trial Membership. Members Sign In.

Select Shipping Options (1 of 1)
Select a shipping method for the items you are shipping to the address listed.

Shipping Method

Select a shipping method for the items below and click "Continue Checkout."

Shipping to:
Joe Smith         ( or )    [SELECT A DIFFERENT ADDRESS]
123 Pine
Anywhere, Town

| Qty. | Item Description | Gift Options | Availability |
|---|---|---|---|
| 1 | Lifting Belt<br>Color: Black<br>Size: Medium<br>Item#: 1998059 | Not Available | IN STOCK<br>You can expect to receive your item(s) between 12/17/09 and 12/23/09<br>(Details) |

Select Shipping Method:
  Signup for ShopRunner and get FREE 2-Day Shipping learn more
  Members Sign In
    ○ Standard, (3-6 business days) - $5.99 (Details)
    ○ 2 Day, (2 business days) - $11.48 (Details)
    ○ One-Day, (1 business day) - $17.96 (Details)

Merchandise Subtotal:    $54.99
Eligible for FREE 2-Day Shipping learn more:
Sales Tax:    $ 3.66
Estimated Total:    $ 64.64

[CONTINUE CHECKOUT]

MERCHANT

To place an order call 1-800-000-000

Search [      ] [Go]

Home | Log-in | Track Order | Help Desk     ✉ Sign up, get 10% off!     🛒 Cart ( 0 items )

| Outlet | Gift Center | Group Sales | Baseball | Basketball | Football | Exercise | Golf | Fan Shop | Apparel | Footwear |

CHECKOUT

Addresses » Shipping » Payments » Review » Receipt

Items in your cart qualify for FREE 2-Day Shipping by ShopRunner. Click here for a free 30-Day Trial Membership. Members Sign In.

Select Shipping Options (1 of 1)
Select a shipping method for the items you are shipping to the address listed.

Shipping Method

Select a shipping method for the items below and click "Continue Checkout."

Shipping to:
Joe Smith         ( or )    [SELECT A DIFFERENT ADDRESS]
123 Pine
Anywhere, Town

| Qty. | Item Description | Gift Options | Availability |
|---|---|---|---|
| 1 | Lifting Belt<br>Color: Black<br>Size: Medium<br>Item#: 1998059 | Not Available | IN STOCK<br>You can expect to receive your item(s) between 12/17/09 and 12/23/09<br>(Details) |

Select Shipping Method:
Signup for ShopRunner and get FREE 2-Day Shipping learn more
Members Sign In
[ Standard (est. $2.49)  ▼ ]

Merchandise Subtotal:    $54.99
Eligible for FREE 2-Day Shipping learn more:
Sales Tax:    $ 3.66
Estimated Total:    $ 64.64

[CONTINUE CHECKOUT]

FIG. 2Q

MERCHANT   To place an order call 1-800-000-000   Search [  ] [Go]

Home | Log-in | Track Order | Help Desk    ✉ Sign up, get 10% off!    🛒 Cart ( 0 items )

| Outlet | Gift Center | Group Sales | Baseball | Basketball | Football | Exercise | Golf | Fan Shop | Apparel | Footwear |

CHECKOUT

Addresses » Shipping » Payments » Review » Receipt

Items in your cart qualify for FREE 2-Day Shipping by ShopRunner. Click here for a free 30-Day Trial Membership. Members Sign In.

Select Shipping Options (1 of 1)
Select a shipping method for the items you are shipping to the address listed.

Shipping Method

Select a shipping method for the items below and click "Continue Checkout."
Some items in your order must ship separately. From the options below, select your preferred shipping method for all items in your order. Note: If you change any of the shipping methods below, you must wait for the page to fully refresh to view your new shipping total.

Shipping to:
Joe Smith    ( or )    [SELECT A DIFFERENT ADDRESS]
123 Pine
Anywhere, Town

| Qty. | Item Description | Gift Options | Availability |
|---|---|---|---|
| 1 | Home Gym<br>Item#: 2447120 | Not Available | IN STOCK<br>You can expect to receive your item(s) between 12/18/09 and 12/28/09 (Details) |

Select Shipping Method:
⦿ Standard, (3-6 business days) - $129.99 (Details)

| Qty. | Item Description | Gift Options | Availability |
|---|---|---|---|
| 1 | Leather Game Basketball<br>-New Low Price!<br>Item#: 2674368 | Not Selected | IN STOCK<br>You can expect to receive your item(s) between 12/16/09 and 12/22/09 (Details) |
| 1 | Football<br>Item#: 2994288 | Not Selected | IN STOCK<br>You can expect to receive your item(s) between 12/16/09 and 12/22/09 (Details) |

Select Shipping Method:
Signup for ShopRunner and get FREE 2-Day Shipping learn more
Members Sign In
○ Standard, (3-6 business days) - $5.99 (Details)
○ 2 Day, (2 business days) - $14.42 (Details)
○ One-Day, (1 business day) - $18.98 (Details)

Merchandise Subtotal: $2314.97
Estimated Shipping and Handling Subtotal: $135.98
Eligible for FREE 2-Day Shipping learn more:
Sales Tax: $ 3.66
Estimated Total: $ 64.64

[CONTINUE CHECKOUT]

FIG. 2S

MERCHANT  To place an order call 1-800-000-000  Search [     ] [GO]

Home | Log-in | Track Order | Help Desk   ✉ Sign up, get 10% off!   🛒 Cart ( 0 items )

| Outlet | Gift Center | Group Sales | Baseball | Basketball | Football | Exercise | Golf | Fan Shop | Apparel | Footwear |

CHECKOUT

| Addresses » | Shipping » | Payments » | Review » | Receipt |

Items in your cart qualify for FREE 2-Day Shipping by ShopRunner. Click here for a free 30-Day Trial Membership. Members Sign In.

Select and Enter Payment Options

STEP 1 (of 2):

Enter Gift Certificates or Promotion/Discount Codes

To apply a promotion Code or to your order, enter the code below. Promotion codes may void existing promotions that have already been applied.

Gift Certificates & Promotion/Discount Codes
Enter your Gift Certificate A PIN is not required for Gift Certificates purchased prior to 08/23/2006. (Please Note: These Gift Certificates are case sensitive, e.g.: A1d2A3)

[          ] [      ] (required for some gift certificates)

You may apply more than one gift certificate to your order, but you must apply them one at a time. If there is a balance remaining on your order, you will be able to add another gift certificate after you click Apply.   [APPLY]

Cost Summary
Merchandise Subtotal: $2314.97
Shipping and Handling: $135.98
Sales Tax: $162.47
Total Order Cost: $2483.43

STEP 2 (of 2):

Enter Payment Information

Please select your form of payment information below. When paying with a credit card, your current billing address information must match the name and billing address on your credit card statement to avoid processing delays.

🔒 All transactions are safe & secure Click Here for details

Current Billing Address
Joe Smith
123 Pine
Anywhere, Town

[USE A DIFFERENT BILLING ADDRESS]

◉ Pay with a saved credit card

1. Select a saved credit card     2. Enter your Credit Card Identification Number Visa ending 4745     ID#: [     ] (What's this?)

○ Pay with a new credit card

1. Enter credit card information     2. Enter your Credit Card Identification Number
Card Type: [Please Select ▼]     ID#: [     ] (What's this?)
Card #: [           ]
Expires: [Select One ▼] [Select One ▼]

FIG. 2U

MERCHANT  To place an order call 1-800-000-000          Search [      ] [Go]

Home | Log-in | Track Order | Help Desk    ✉ Sign up, get 10% off!    🛒 Cart ( 0 items )

| Outlet | Gift Center | Group Sales | Baseball | Basketball | Football | Exercise | Golf | Fan Shop | Apparel | Footwear |

CHECKOUT

Addresses » Shipping » Payments » Review » Receipt

Congratulations on selecting FREE 2-Day Shipping by ShopRunner. Members Sign Out.

Select and Enter Payment Options
STEP 1 (of 2):
Enter Gift Certificates or Promotion/Discount Codes To apply a promotion Code or to your order, enter the code below. Promotion codes may void existing promotions that have already been applied.

Gift Certificates & Promotion/Discount Codes
Enter your Gift Certificate A PIN is not required for Gift Certificates purchased prior to 08/23/2006. (Please Note: These Gift Certificates are case sensitive, e.g.: A1d2A3)
[         ]   [         ] (required for some gift certificates)
You may apply more than one gift certificate to your order, but you must apply them one at a time. If there is a balance remaining on your order, you will be able to add another gift certificate after you click Apply.    [APPLY]

Cost Summary
Merchandise Subtotal: $2314.97
Shipping and Handling: $135.98
ShopRunner Shipping: $0.00
Sales Tax: $162.47
Total Order Cost: $2483.43

STEP 2 (of 2):
Enter Payment Information

Please select your form of payment information below. When paying with a credit card, your current billing address information must match the name and billing address on your credit card statement to avoid processing delays.

🔒 All transactions are safe & secure Click Here for details

● Pay with a saved credit card
  1. Select a saved credit card        2. Enter your Credit Card Identification Number
  Visa ending 4745                     ID#: [     ] (What's this?)

○ Pay with a new credit card
  1. Enter credit card information     2. Enter your Credit Card Identification Number
  Card Type: [Please Select ▼]         ID#: [     ] (What's this?)
  Card #: [                    ]
  Expires: [Select One ▼] [Select One ▼]

Current Billing Address
Joe Smith
123 Pine
Anywhere, Town

[USE A DIFFERENT BILLING ADDRESS]

FIG. 2V

MERCHANT

To place an order call 1-800-000-000

Search [    ] [GO]

Home | Log-in | Track Order | Help Desk | ✉ Sign up, get 10% off! | 🛒 Cart (0 items)

Outlet | Gift Center | Group Sales | Baseball | Basketball | Football | Exercise | Golf | Fan Shop | Apparel | Footwear

CHECKOUT

Addresses » Shipping » Payments » Review » Receipt

Why are some items not eligible for FREE 2-Day Shipping by ShopRunner? learn more Members Sign Out

Payment Details and Options

Bill to: [CHANGE]
Joe Smith
123 Pine
Anywhere, Town

Payment Method: [CHANGE]
Visa:
\*\*\*\*\*\*\*\*\*\*4745

Gift Options: [CHANGE]
- Gift Wrap
No

Order Details and Options (Return to your Shopping Cart to adjust quantities or remove items.)

1. Shipping To: [CHANGE]
Joe Smith
123 Pine
Anywhere, Town
[SHIP TO MORE THAN ONE ADDRESS]

Shipping Method:
Standard, (3-6 business days)

| Qty. | Item Description | Gift Options | Price Each | Total |
|---|---|---|---|---|
| 1 | Gym<br>Item#: 2447120<br>IN STOCK: You can expect to receive your item(s) between 12/18/09 and 12/28/09 (Details) | Not Available | $2199.99 | $2199.99 |

2. Shipping To: [CHANGE]
Joe Smith
123 Pine
Anywhere, Town
[SHIP TO MORE THAN ONE ADDRESS]

Shipping Method:
● ShopRunner, FREE 2-Day Shipping - FREE
○ Standard, (3-6 business days) - $5.99 (Details)
○ 2 Day, (2 business days) - $11.48 (Details)
○ One-Day, (1 business day) - $17.96 (Details)

| Qty. | Item Description | Gift Options | Price Each | Total |
|---|---|---|---|---|
| 1 | Basketball - New Low Price!<br>Item#: 2674368<br>IN STOCK: You can expect to receive your item(s) between 12/16/09 and 12/22/09 (Details)<br>🚚 FREE 2-Day Shipping | Not Selected | $89.99 | $89.99 |

Cost Summary

| | |
|---|---|
| Merchandise Subtotal: | $2314.97 |
| Shipping and Handling: | $135.98 |
| 🚚 ShopRunner Shipping: | $0.00 |
| Sales Tax: | $162.47 |
| Total Order Cost: | $2483.43 |
| Remaining Balance: | $2483.43 |

(To be applied to credit card)

FIG. 2W

MERCHANT

To place an order call 1-800-000-000

Search [    ] [GO]

Home | Log-in | Track Order | Help Desk   ✉ Sign up, get 10% off!   🛒 Cart ( 0 items )

Outlet | Gift Center | Group Sales | Baseball | Basketball | Football | Exercise | Golf | Fan Shop | Apparel | Footwear

CHECKOUT

Addresses » Shipping » Payments » Review » Receipt

Thank You For Your Order                             🖶 Print Receipt

Thank you for shopping at Fogdog Sports. We appreciate your order. Please print out this receipt for your records.

You will receive e-mail communications to keep you updated on the status of your order.

If you notice a problem with your order, you may be able to cancel it. When you receive an e-mail confirming your order, click on the corresponding link in the e-mail to cancel your order.

Order Number: 8080857786
Order Date: 12/17/09 at 4:23:30 PM (EST)
Order Total: $20.98

> Thanks for using FREE 2-Day Shipping by ShopRunner!
> Get $10 - Invite a Friend

---

Before You Go...

Enjoy great benefits the next time you shop!
By simply supplying a password, you can enjoy the following benefits when shopping with us in the future:
- faster checkout
- save your addresses in an address book
- keep all your credit cards on file
- ability to track your current orders and review your order history
- quick access to products saved in your shopping bag
- improved customer service To create an account, simply enter a password to the right and click, "Sign In".

Save your Account Information

E-mail Address:

Password: [    ]

Confirm Password: [    ]

[SIGN IN]

---

Payment Details and Options

| Bill to: | Payment Method: | Gift Options: |
|---|---|---|
|  | American Express | -Gift Wrap |
|  | ***********1007 | No |

FIG. 2X shop runner

My Account
Account Settings
Add Another Credit Card
Exclusive Offers
Order Tracking (receipts)
Print & Return Label
Refunds / Credits Issued
Download Offer Toolbar

Family & Friends
Invite a Friend - Get $10
Track Invites
Invite Household Members

Legal
Terms and Conditions
Privacy Policy member sign in | get $10 - invite a friend | Member Discounts | Shop | My Account Home | How it Works | Retail Partners

Get $10 - Invite a Friend

We'll cut you a $10 check for every friend who activates a ShopRunner account.

to: Enter your friends' email addresses message: I know you are an avid online shopper. Check out this new service....

Invites Sent: 122         Cash Earned: $80.00

Copy and paste your personal invitation link http://www.ShopRunner.com/Invite/DX23410

SYSTEM AND METHOD FOR SUBSCRIPTION-BASED DELIVERY SERVICE

CROSS-REFERENCE TO RELATED APPLICATIONS

This application claims priority to U.S. Provisional Patent Application No. 61/388,676, filed Oct. 1, 2010, which is incorporated herein by reference in its entirety.

FIELD OF THE INVENTION

The present invention relates to a subscription-based service for delivery of purchased products.

BACKGROUND

Studies have shown that the costs associated with delivery of items purchased, over the Internet or otherwise, significantly influence the purchasing behavior of consumers. For example, many consumers indicate that offers of free delivery would entice such consumers to make more purchases, spend more money on purchases and make purchases from merchants that offer free delivery instead of from merchants that do not. However, absorbing the costs associated with delivering products may have a significant impact on a merchant's margins. Thus, there is a need to offer delivery options to consumers that are attractive from a cost perspective, but have as little negative impact as possible on merchants' margins.

SUMMARY OF INVENTION

One embodiment of the present invention is directed to a system, method and computer-readable media. Data received from one of a plurality of merchants is accessed and processed. The data includes an order to purchase from the merchant by a user a product pursuant to a service that provides the user with a discounted delivery cost on products purchased by the user from any of the plurality of merchants. At least some of the merchants offer products for sale by way of a plurality of different retail channels. Data that includes information regarding products shipped pursuant to the service is also accessed and processed.

In some embodiments, the discounted delivery cost comprises a free delivery cost. The discounted delivery cost may apply to an unlimited number of purchases made by the user during the time period. The discounted delivery cost may be applicable to purchases made by one or more individuals in a household of the user. The service may include a discounted delivery cost for returns of products purchased using the service, which may be free.

In a further embodiment of the present invention, user preference information is stored, which includes address information, user payment information and delivery information. The delivery information describes a service associated with a discounted delivery cost of a product purchased by the user from any of a plurality of merchants. Data comprising an indication to purchase a product by the user, initiated from a product detail page displayed by the merchant for the product, is received from one of the plurality of merchants. Data comprising an order to purchase the product from the merchant by the user and to delivery the product to the user using the service is received from the merchant.

BRIEF DESCRIPTION OF THE DRAWINGS

The foregoing summary, as well as the following detailed description of various embodiments, will be better understood when read in conjunction with the appended drawings. It should be understood, however, that the invention is not limited to the precise arrangements and instrumentalities shown.

In the drawings:

FIGS. 4A-4E are exemplary user interfaces that may be shown in connection with an embodiment of the present invention.

DETAILED DESCRIPTION

Figure 1:
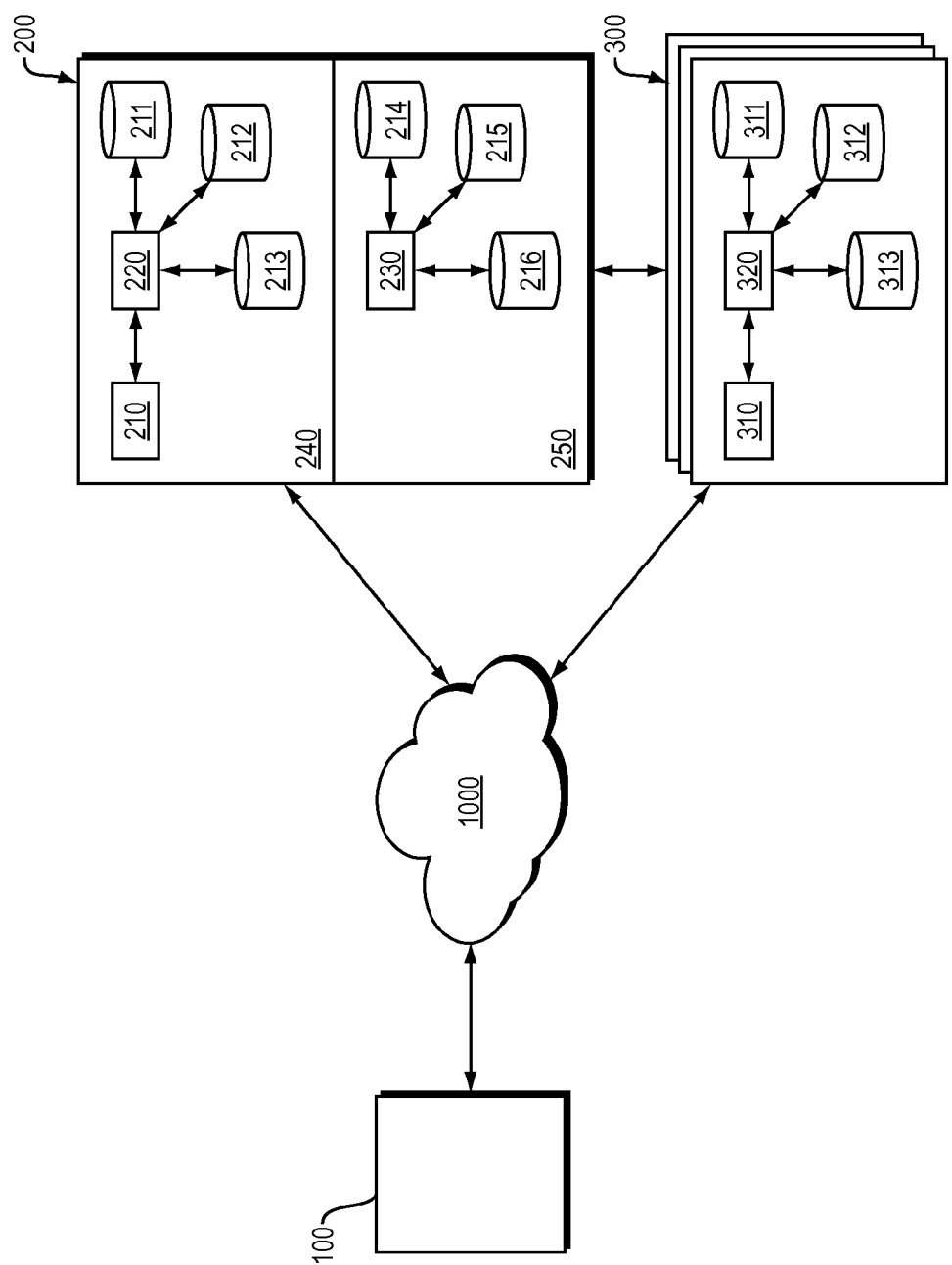
FIG. 1 is a diagram illustrating an exemplary system of the present invention.

The systems and methods described herein relate to a subscription-based program that provides delivery services for products purchased by consumer members of the program from any of a plurality of different merchant members using any of a plurality of different channels (i.e., over the Internet, in a "brick-and-mortar" store, over the telephone, and/or through mail order, by way of example). Consumer member acquisition may also be multi-channel (i.e., consumers may become introduced to the program in both on- and off-line shopping environments).

The described delivery service program is beneficial to consumer members and merchant members alike. Merchant members can maintain and increase sales through a reduction of cart abandonment, customer conversion, customer loyalty and customer frequency. Further, such merchant members make take advantage of cross-selling with other merchants that are members of the program. Merchant members may achieve an increased marketing return on investment. In particular, the amounts incurred by a merchant in connection with being a member of the delivery service program may be returned through increased sales, loyalty, frequency, conversion and cross-selling. Merchant members may also realize incremental profits from lead generation through the program. Because the provider of the delivery service program is involved with facilitating purchases of products offered by a multitude of different retailers, the service provider has access to sales data across retailers, which can be used for targeted marketing across retailers. In exchange for payment of a subscription fee, consumer members receive the benefit of free, or discounted, delivery and, in some embodiments, other benefits as described more fully herein.

The delivery service program may be used in connection with purchased products that need to be shipped from a merchant store or warehouse and may also be used in connection with products that are to be delivered shortly after being ordered by the consumer (e.g., pizza) or prepared by the merchant (e.g., flowers).

Merchants participating in the delivery service program may agree with the service provider to perform a variety of different activities to promote the delivery service program to consumers. For example, a merchant may agree to include a logo/tagline associated with the delivery service program on the Web pages on which products eligible for the delivery service program are offered for sale; to promote delivery service program enrollment prominently on all checkout pages and other pages within the merchant's Web site; to promote the program elsewhere in the merchant's marketing and communications to consumers (e.g. radio, television or print advertising); and to offer store associates an incentive program to promote the delivery service program at the point-of-sale (i.e., email addresses of interested consumers may be collected at the point of sale, and email messages offering a free trial to such consumers may be sent). In one embodiment, merchants are required to designate as eligible for the delivery service program as many products (identified by SKU number) as possible (i.e., allowing SKUs to be excluded for valid business reasons).

In an exemplary embodiment, the delivery service provides for a certain amount (e.g., unlimited) of discounted (e.g., free) delivery of a specified service level (i.e., a delivery service level that is faster than that which a merchant offers without charge, or on a discounted basis, in the absence of the delivery service program described herein, e.g., expedited, 2-day) within a given territory (e.g., United States). For certain products (e.g., flowers, take-out food), the service level may be within 24 hours, or less than 1 hour, accordingly. Thus, the present invention is intended to cover all different service levels of delivery. The delivery service is offered to consumers on a subscription basis at a given cost per period. Different lengths and types of membership and associated costs may be offered within the scope of the present invention. In addition, free trial periods may or may not be offered, also within the scope of the present invention. In one embodiment, the cost to a consumer to become a member of the delivery service program is set such that consumers who make significant purchases (both in terms of number of purchases and dollar amounts of purchases) are more likely to become members. In certain exemplary embodiments, the benefits of the delivery service can be shared with up to a certain number (e.g., 4) of family members. In certain exemplary embodiments, the consumer is entitled to at least some free delivery on returns. Members-only promotions may also be made available. Still further, a subscription to the delivery service program may be given as a gift, and consumer members may be given a reward for referring other consumers to the program.

FIG. 1 is a schematic diagram illustrating an exemplary system of the present invention. The system includes consumers each employing a client device 100, service provider 200, which maintains the delivery service program, and a plurality of merchants 300 who sell products that can be shipped using the delivery service program. Client device 100 may communicate with service provider 200 and merchant(s) 300 over a communications network 1000. Client device 100 may be a computer workstation, portable computer, personal computer, handheld device, such as a personal digital assistant, cellular phone, or the like. Client device 100 may be wired into the communication network 1000 or may be wireless. Client device 100 may include a web browser or other graphical user interface as well as other computer applications. Communication network 1000 is, in the exemplary embodiment, a wide area network (WAN), such as the Internet, wireless networks (WiFi), cellular networks, or any combination thereof.

Service provider 200 facilitates consumer and merchant enrollment in the program and is responsible for implementation of the program, as described in more detail herein. In one embodiment, the system of service provider 200 employs a split architecture. System 240 includes Web server(s) 210, application server(s) 220, and database server(s)/database(s) 211, 212 and 213. System 250 includes application server(s) 230 and database server(s)/database(s) 214, 215 and 216. System 250 maintains the data and logic used in connection with member support. System 240 maintains one or more websites for service provider 200 and performs customer service functionality. System 240 makes calls to system 250 in order to obtain data that is required to process consumer transactions.

A plurality of merchants 300 offer products for sale to consumers. At least some of these merchants offer products for sale through multiple channels, for example, over the Internet (e.g., network 1000), at a brick-and-mortar store, through mail order, or over the telephone. Each of merchants 300 employs a system that includes Web server(s) 310, application server(s) 320, and database server(s)/database(s) 311, 312, and 313. In addition to each of merchants 300 maintaining its own sales portal accessible over the Internet (e.g., a website hosted by Web server(s) 310), some of the merchants 300 may offer products for sale that are eligible for the delivery service program by way of an on-line marketplace maintained by service provider 200 (e.g., a website hosted by Web server(s) 210). The present invention contemplates a plurality of merchant members (only three of which are represented in FIG. 1 for illustrative purposes).

In one embodiment, system 250 employs a content delivery network ("CDN"), not shown) to deliver certain content to merchants 300 for display on the merchants' Web sites. Thus, for example, non-SSL content (e.g., content for the home page, product pages and category pages) is delivered by system 250 to a CDN and cached for a period of time (e.g., 6 hours) to allow for quick delivery to the merchants' Web sites. In contrast, SSL content (e.g., secure pages to be displayed on the merchant site) is sent directly from system 250.

The hardware and software employed by the systems of FIG. 1 are now generally described. The database server may include a database services management application that manages storage and retrieval of data from the database(s). The databases may be relational databases; however, other data organizational structure may be used without departing from the scope of the present invention. The application server is in communication with the database server. The application server communicates requests for data to the database server. The database server retrieves the requested data. The application server may also send data to the database server for storage in the database(s). The application server comprises one or more processors, computer readable storage media that store programs (computer readable instructions) for execution by the processor(s), and an interface between the processor(s) and computer readable storage media. The web server also comprises one or more processors, computer readable storage media that store programs (computer readable instructions) for execution by the processor(s), and an interface between the processor(s) and computer readable storage media. The web server is employed to deliver content that can be accessed through the communications network. When data is requested through an application, such as a web browser, the web server receives and processes the request. The web server sends the data or application requested along with user interface instructions for displaying a user interface. The computers referenced herein are specially programmed to perform the functionality described herein.

The computer readable storage media may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system.

It will be understood by those skilled in the art that alternate system configurations could be employed within the scope of the present invention.

Merchant members must integrate their systems with that of service provider in order to become active in the delivery service program. In particular, merchant members will be required to make changes to their existing user interfaces and back end systems. As described in more detail herein, consumers may join the program in a variety of different ways. One way a consumer can join is via the merchant member Web site, which requires that the merchant member integrate their systems with that of the service provider. As described elsewhere herein, in the preferred embodiment, various icons and messaging inviting the consumer to enroll in the service are presented on the Web site of the merchant member and, if the consumer elects to enroll by clicking on messaging on the merchant member Web site, the consumer is actually interacting with the systems of the service provider to enroll in the service (i.e., not the systems of the merchant member). Integration also allows consumers to authenticate as existing members (again, via the merchant member Web site, but interacting with the systems of the service provider), identify which products are eligible for the program, and have purchased products shipped using the delivery service program.

Figure 2B:
FIGS. 2A through 2Z are exemplary user interfaces that may be shown in connection with one embodiment of the present invention.
Figure 2F:
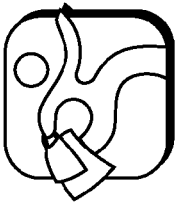
Figure 2G:
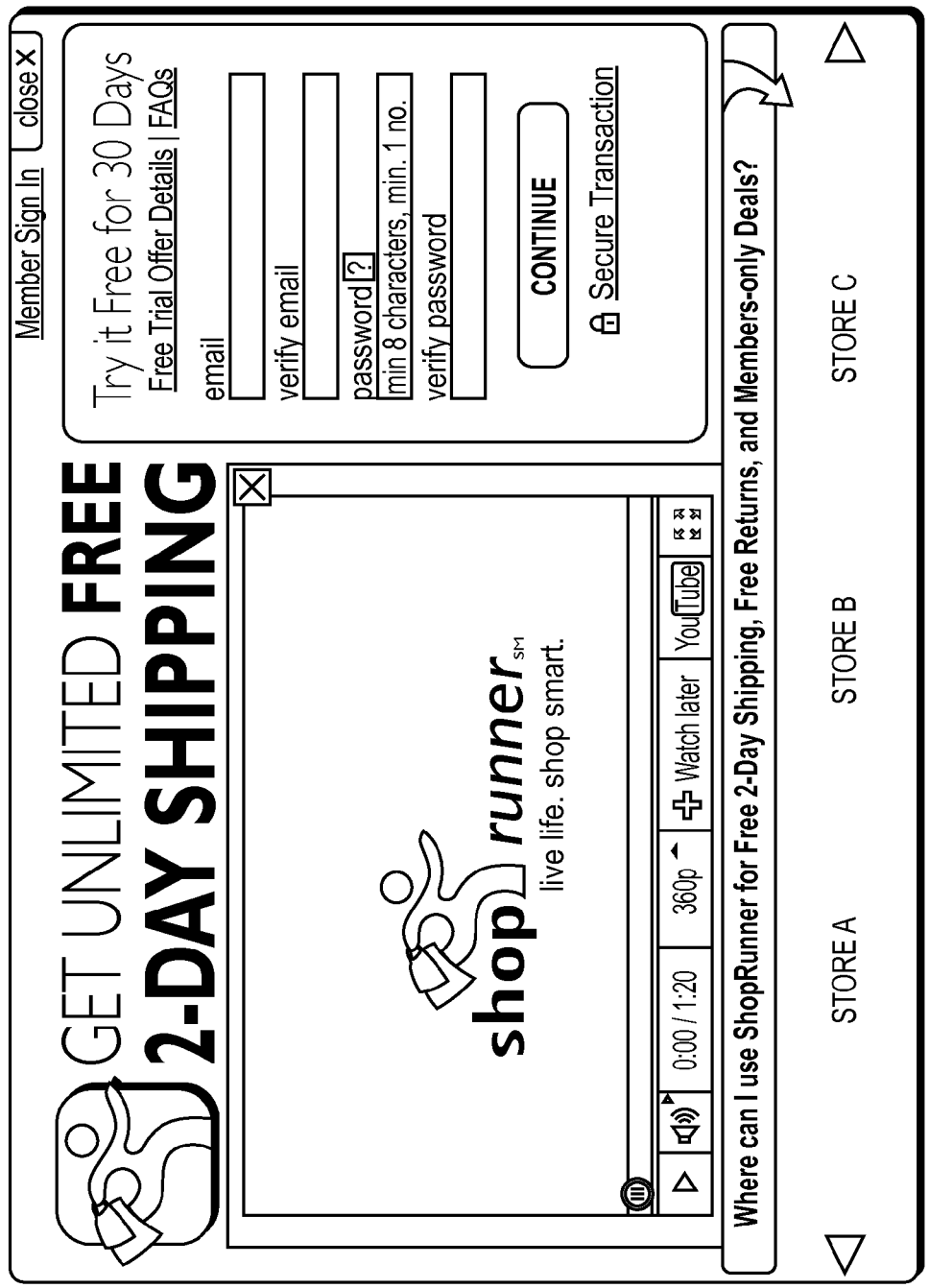

One aspect of integration involves ensuring that the appropriate branding and other messaging relating to the delivery service program is displayed on the merchant website. In particular, consumers are exposed to content with delivery service program branding at various points throughout their experience visiting a merchant member's site, including, by way of example, the following pages: home (consumer will see a branded banner which, when clicked, will display a "Learn More" page), illustrated in FIG. 2A; category (consumer will see branding and text next to each eligible product on the category page), illustrated in FIG. 2B; product (consumer will see branding and messaging on the product page of each eligible item), illustrated in FIG. 2C; cart (consumer will see messaging next to each eligible item in the cart), illustrated in FIG. 2J; sign in (customer logs into service), illustrated in FIG. 2K; and checkout (customer selects the service in the ship method area of the check out page), illustrated in FIG. 2P.

The messaging is accomplished by way of code that is implemented on the merchant's site during integration. In particular, the service provider makes available to each merchant member computer code to be implemented on appropriate locations throughout the Web site of the merchant member. The computer code serves as a guide mark, indicating where content relating to the delivery service program is to be displayed on the Web site of the merchant member. Each time a consumer visits the Web site of a merchant member, the code on that page executes and makes a call to application server(s) 230 requesting the content (i.e., the content is merchant-specific, in one embodiment) that is to be displayed to the consumer as he visits the various pages of the merchant member site. The content to be displayed is retrieved from the service provider systems 200, maintained by the merchant member for the session, and displayed on the consumer's browser as appropriate during the session. Thus, the merchant is not responsible for maintaining on its systems the content that is to be displayed to the consumer; instead, the service provider maintains control over the content.

As described above, the content that is displayed may be icons and messaging relating to various aspects of the delivery service program including, for example, information about the program; offers for a free trial; enrollment in the program; log in if the consumer is already a subscriber to the program; and indications of products that are eligible for the program. The type of messaging that displays will depend on the consumer's log-in status and point of progress in the shopping process. In one embodiment, there are three different states that govern the type of messaging displayed to the consumer. If the consumer is not logged in, a first set of messaging is displayed and, if the consumer is logged in, a second set of messaging is displayed. For example, "Learn More" and "Free 30-Day Trial" (see, e.g., FIGS. 2D through 2I) type-messaging will only appear to customers that have not yet logged in. In a third state, the system knows that the client has visited the site before and applied for the service or logged in to the service. In this state, for example, messaging will be presented that invites the consumer to log in to the service.

Code may also be provided in the footer of the Web site pages of merchant member to allow for tracking of marketing activity.

Figure 2H:
Figure 21:

A consumer may enroll in the delivery service program in a variety of different ways. For example, the consumer may enroll in the program by way of accessing a website maintained by service provider 200. Alternatively, when visiting the Web site of a member merchant, the consumer will have multiple opportunities to subscribe to the delivery service program during the shopping experience and can click on any branded link to subscribe. Other methods of enrolling in the delivery service program (such as, e.g., by calling or writing service provider 200 or merchant(s) 300) are within the scope of the present invention. If enrolling by way of a website maintained by service provider 200, the consumer device 100 interacts with system 240, which communicates with system 250 through an API, to exchange information that is required for enrollment. Data relating to the enrollment information provided by the consumer is stored using database server(s)/databases(s) 214, 215 and/or 216. If enrolling by way of a Web site maintained by merchant 300, in one embodiment, while it appears to the consumer that the consumer is interacting with the merchant system 300, the consumer is in fact exchanging information with system 250 of service provider 200. This is accomplished by way of code implemented on the merchant's website during integration. The code displays an interface on the consumer's browser, overlaying the merchant's Web page currently showing to the consumer, that accepts the input of enrollment information. The enrollment information entered by the consumer is exchanged with system 250, not merchant system 300. Using this approach, the merchant 300 has no access to the personal information of the consumer. FIGS. 2H and 2I provide exemplary enrollment interfaces.

In the exemplary embodiment, the interfaces shown in FIGS. 2D through 2I are overlaid on the pages of the web site that the consumer is viewing, which pages remain in the background displayed via the consumer's browser.

Figure 3:
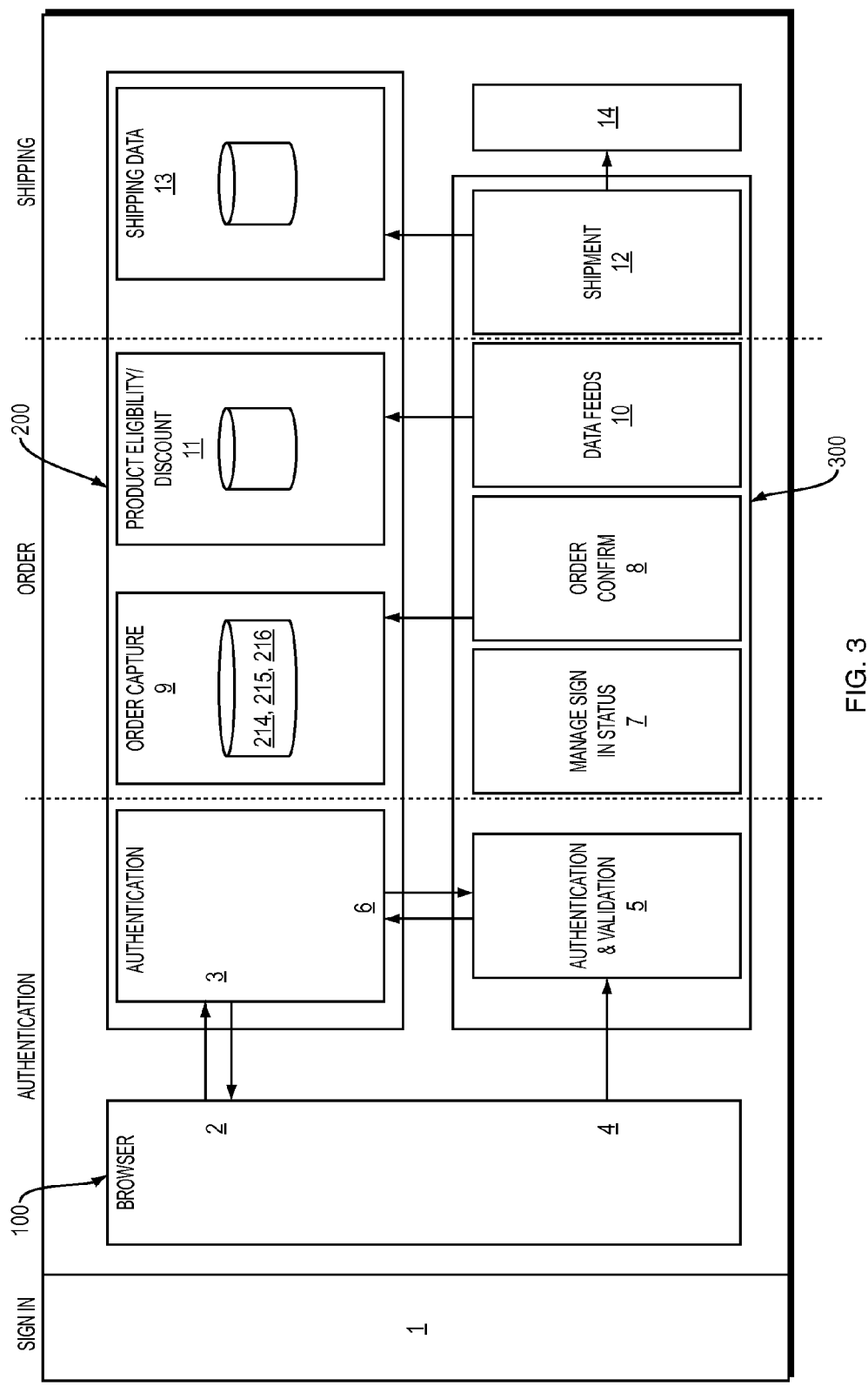
FIG. 3 is a diagram illustrating an exemplary process for carrying out a transaction in accordance with the present invention.

Consumers enrolled in the program may log in at any one of a variety of locations as indicated on the website of merchant 300 or service provider 200. FIG. 2D provides and exemplary log in interface. With reference to FIG. 3, the consumer clicks on the log-in messaging/icon in step 1 and an interface, overlaying the Web page currently showing to the consumer, is displayed on the consumer's browser in step 2. Displaying of the overlay interface is accomplished by way of code implemented on the merchant's web site during integration, similar to that described above with regard to enrollment. The interface captures the log in information input by the user and transmits the information to system 250 in step 3. System 250 processes the information contained in the log in request. If the system 250 determines that the log in information is not valid, an error message is returned and displayed on the consumer's browser. If the system 250 determines that the log in information is valid, a script is used to return an authentication token back to the consumer's browser. The authentication token is then passed by the consumer's browser to the system of the merchant 300 for validation in step 4. The merchant system 300 sends a call to the service provider system 200 to determine if the token is valid in step 5. Upon validating the token by the service provider in step 6, the merchant receives a message that the token is valid, the consumer log in is permitted and Web server 310 of the merchant maintains the login session for the consumer in step 7. A dedicated cookie is set.

Depending on the web page being viewed by the consumer while logging-in, the web page may need to be refreshed upon log-in. For example, for certain pages, the content displayed on the page does not change based on authentication status. For these pages, the page is not refreshed; only the messaging regarding the delivery service program is updated to reflect authentication/registration success. The cookie set upon authentication is read by the code implemented on the page during merchant integration and the code toggles the messaging to be displayed to authentication-dependent messages. Upon sign out, the merchant page must delete the cookie and clear the authentication token value. The messaging on the pages is updated accordingly to reflect the signed out status. For other pages, the entire page must be reloaded upon authentication. For example, pages hosting delivery options must be re-rendered upon a consumer's successful authentication to reflect delivery options available in accordance with the program. Upon sign out, the page is again refreshed to reflect the delivery options reflected outside of the program.

As with the enrollment process, the merchant does not have access to any personal information of the consumer using this log-in approach.

Once logged in, the consumer may purchase a product to be shipped using the delivery service program. As described above, the checkout pages of the merchant member 300 are modified to display the delivery options associated with the delivery service program, which includes disabling of existing ship methods not included with the delivery service program. The checkout pages are further modified to update order totals to reflect the appropriate delivery charges and messaging in place pursuant to the delivery service program.

The order management system of the merchant member 300 must be also updated to include the delivery method(s) offered in connection with the delivery service program, the delivery territories permitted by the delivery service program, as well as the billing codes for the delivery courier associated with the delivery service program.

When the consumer completes a purchase order, the merchant 300 confirms the order, in step 8, and sends the order data, along with the authentication token, to the service provider 200. The data may be sent in batch (i.e., on a daily basis) or contemporaneously upon order processing being completed by the merchant 300. Service provider 200 captures the order information, in step 9, storing the order data provided to it by the merchant 300 and the tracking code in one of database(s) 214, 215 and 216. Merchant 300 sends delivery data to service provider 200, in step 12, which stores the delivery data in one of database(s) 214, 215, and 216, in step 13. Delivery is effectuated, in step 14, by the delivery courier using delivery codes associated with the delivery service program. Printed packing slips and order confirmation electronic messages may also include branding and messaging regarding the delivery service program.

Figure 2J:
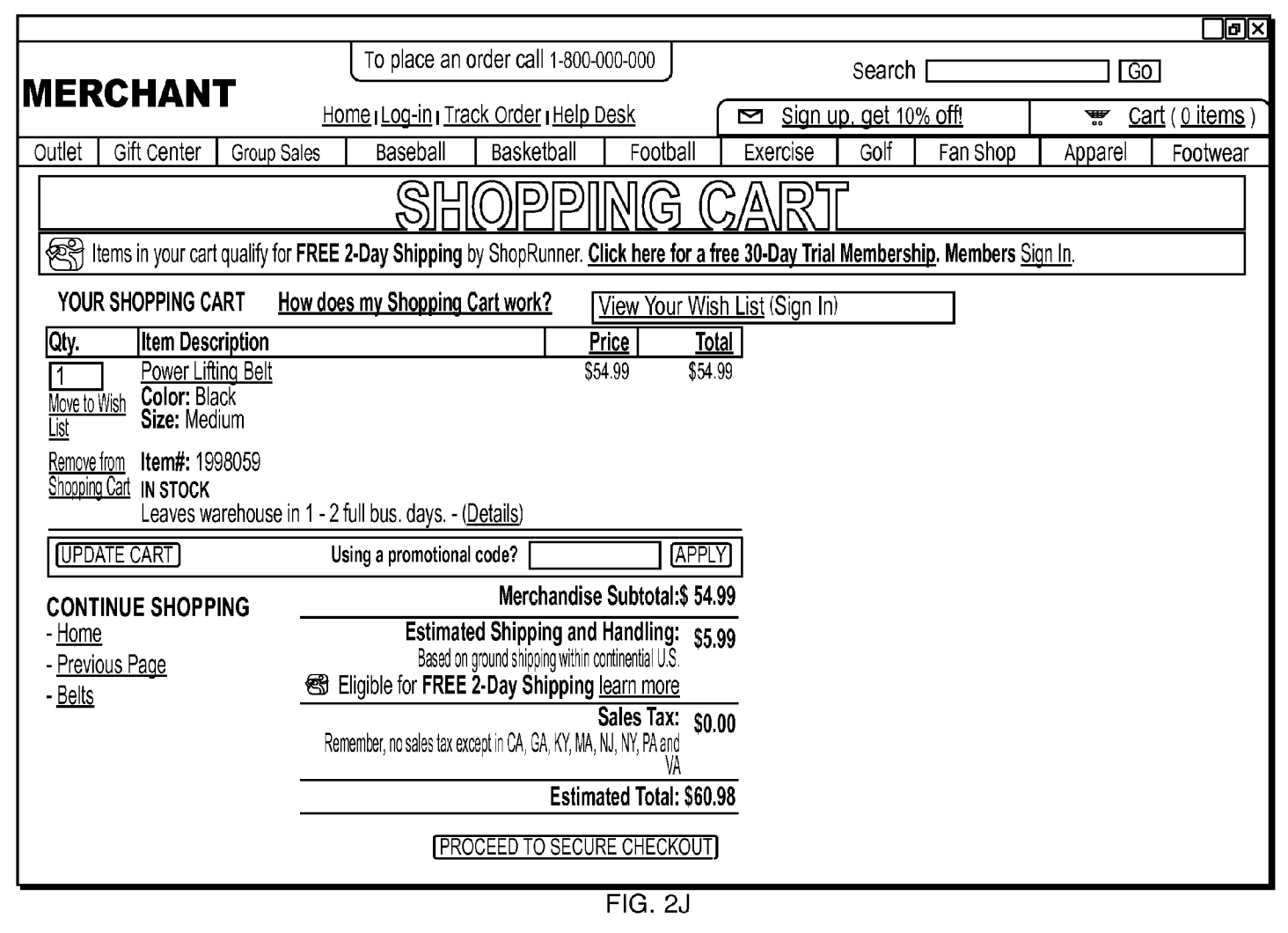
Figure 2K:
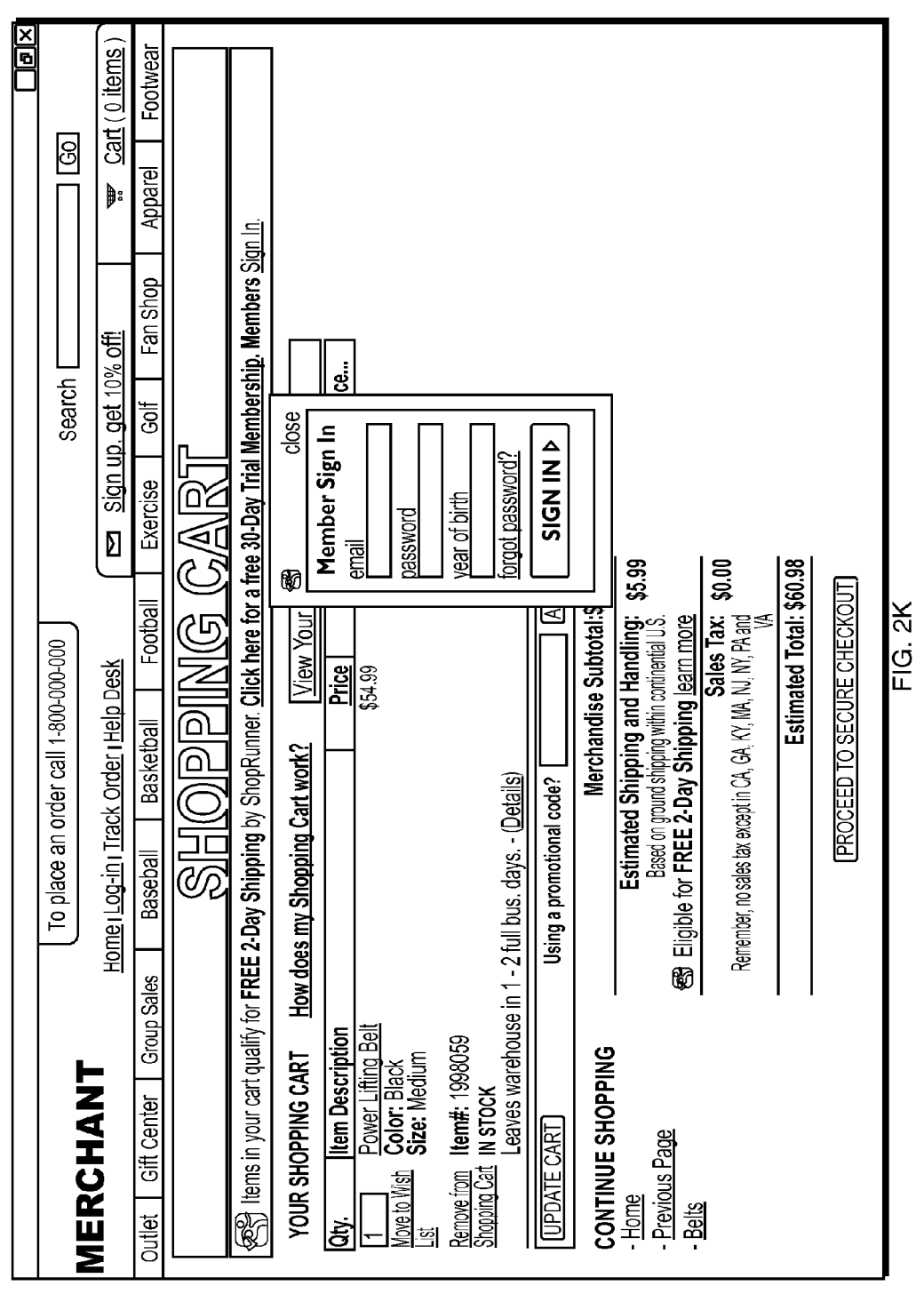
Figure 2L:
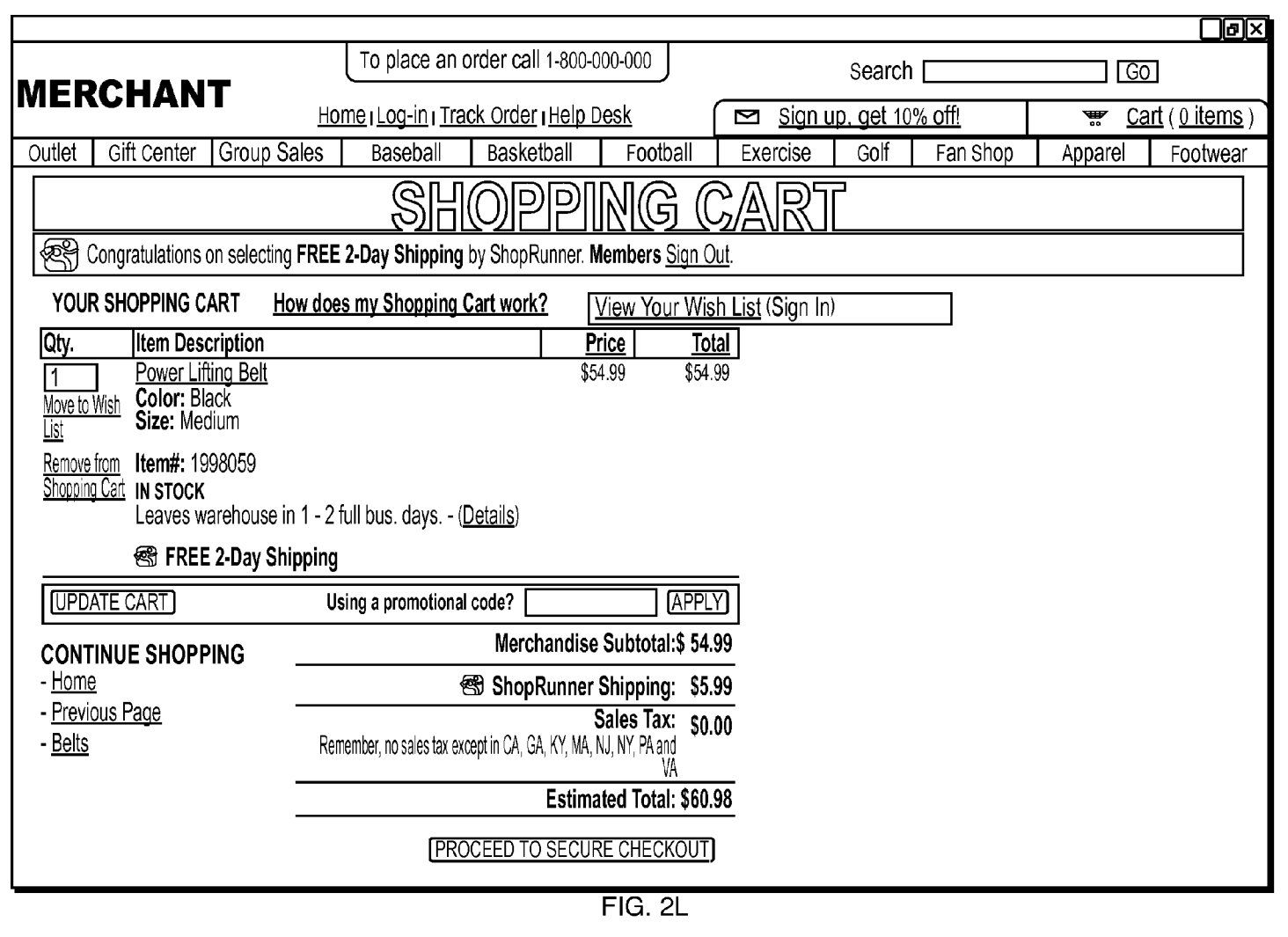
Figure 2N:
Figure 2P:
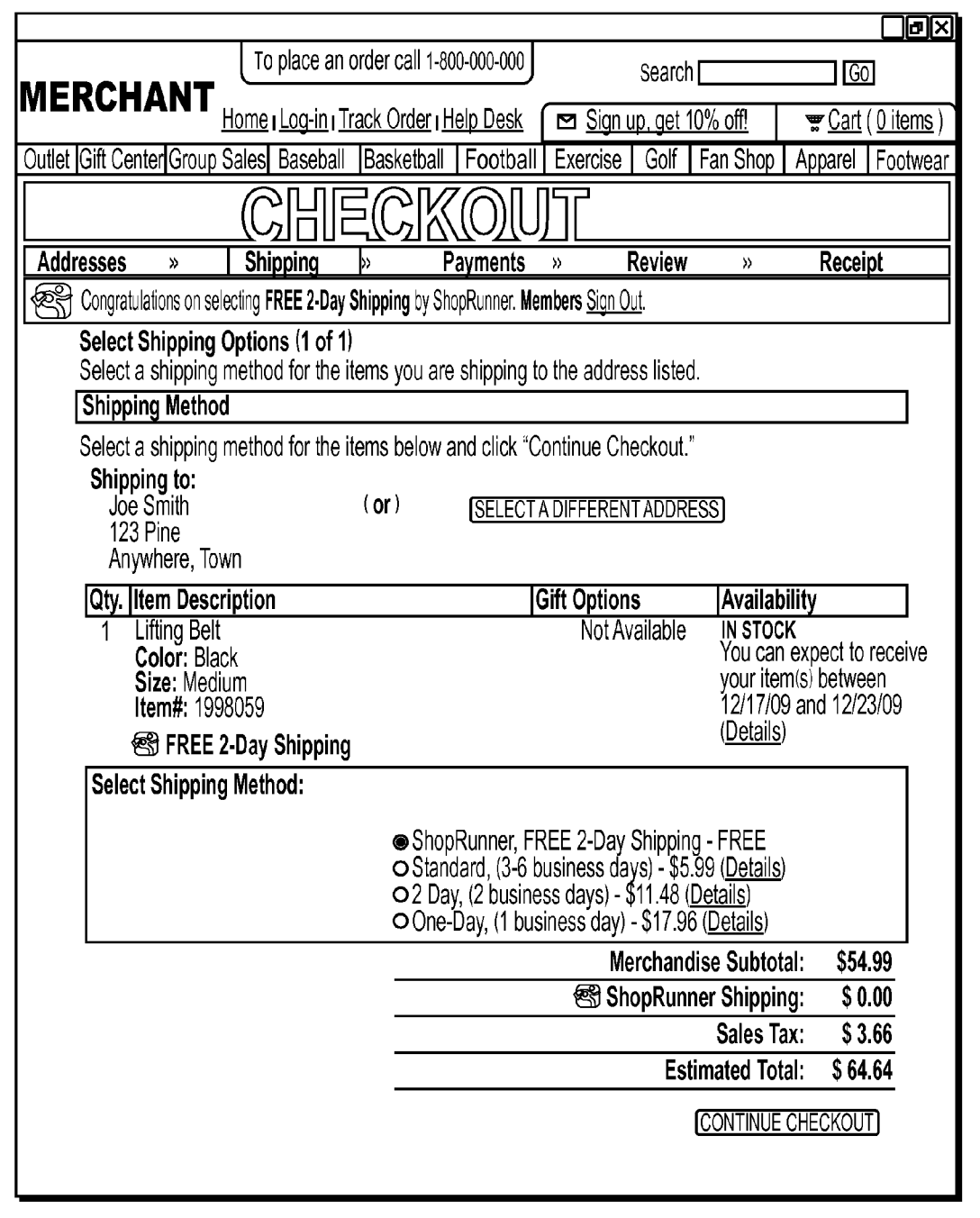
Figure 2R:
Figure 2T:
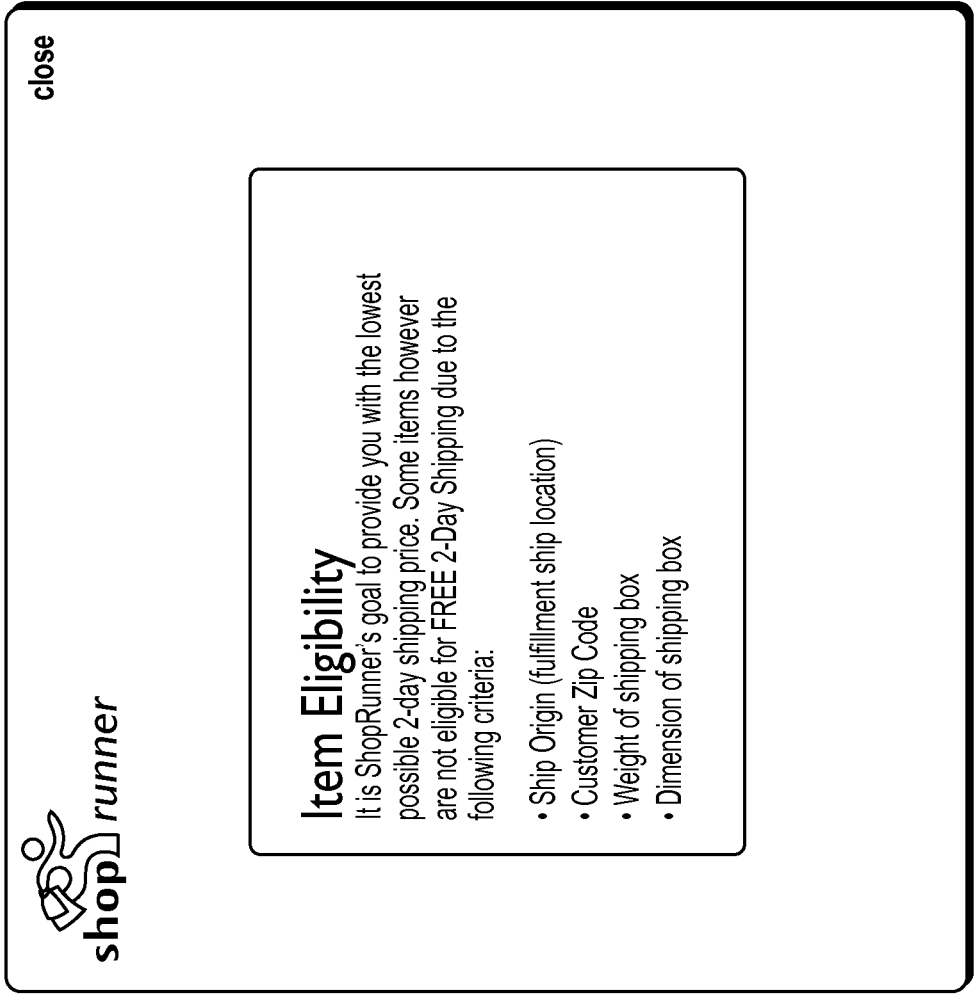
Figure 2Y:

FIGS. 2J through 2Z provide series of exemplary user interfaces that may be displayed to the consumer during the shopping and checkout experience. FIG. 2J illustrates a consumer's cart when the consumer is not logged in to the service. FIG. 2K illustrates the interface overlay that allows the consumer to log in to the service. FIG. 2L illustrates the consumer's cart when the consumer is logged in to the service. FIG. 2M illustrates the consumer's cart that includes items that are eligible for the delivery service program and not eligible for the delivery service program. FIG. 2N shows a pop-up window describing items that are not eligible for the delivery service program. FIGS. 2O and 2P illustrate exemplary, alternative, check out screens for a consumer that is not logged in to the service. FIGS. 2Q and 2R illustrate exemplary, alternative, check out screens for a consumer that is logged in to the service. FIG. 2S illustrates a check out screen for a cart that includes items that are eligible for the delivery service program and not eligible for the delivery service program. FIG. 2T shows a pop-up window describing items that are not eligible for the delivery service program. FIG. 2U illustrates a payment screen for a consumer that is not logged in to the service. FIG. 2V illustrates a payment screen for a consumer that is logged in to the service. FIG. 2W illustrates a screen confirming a consumer's order, indicating delivery in accordance with the program. FIG. 2X illustrates a screen thanking the consumer for his order using the delivery service program; messaging on this screen allows the consumer to invite a friend to enroll in the delivery service program (see FIG. 2Z). FIG. 2Y illustrates a screen thanking the consumer for his order and encourages the consumer to use the delivery service program.

With regard to the data feeds required in connection with integration, the merchant member 300 provides a series of data feeds to service provider 200. The feeds may be sent in batch, or may be accomplished in real time upon completion of order processing by the merchant. Detailed order information for products ordered using the delivery service program (e.g., order number, tracking number, and number of items in shipment), including the authentication token provided by service provider 200, is provided to system 250. Consumers may, thus, track the status of all their orders shipped using the program in one central location (i.e., through the service provider's system), regardless of the merchant from whom the product was purchased. Also, consumers may use the service provider's systems to generate any necessary return labels, in order to take advantage of any free return delivery offered by the program.

Merchant member 300 also provides system 240 with a data feed identifying items eligible for free delivery in connection with the delivery service program. Still further, merchant member 300 provides a data feed to system 240 identifying deals and promotions, if any, to be offered to consumer members 100. This information allows the service provider to employ an on-line marketplace, allowing consumers to search and find products that are eligible for the delivery service program and, in some embodiments, allow for the purchase of such items. In one embodiment of the on-line marketplace, a consumer may comparison shop for eligible items among retailers and click through from the on-line marketplace to the retailer web site to complete a purchase.

In certain circumstances, a consumer may make a purchase in a store of a merchant member 300 that requires delivery. This may include, for example, items that are not presently available at the time of in-store purchase, such as out-of-stock, personalized, customized or expanded assortment products, or gift items to be shipped to a third party. In this scenario, the delivery service program may cover the delivery costs associated with delivery of the product from the merchant's store in which the purchase is made, from another of the merchant's stores or from a warehouse. Consumers who are subscribers to the delivery service program can take advantage of the service for deliveries resulting from these in-store purchases. Merchant members 300 who elect to make the delivery service available to consumers for delivery of products purchased in-store will be required to implement processes to support the delivery service program at the in-store point of sale. This would include the necessary, data feeds, point of sale/inventory system configuration and billing processes, as appropriate.

Items that are eligible for the delivery service program must be identifiable to the merchant's sales person at the point of sale and to the consumer. In-store signage can be used for this purpose. Additionally, the sales person can be prompted by the computer used to process the sale to inform the consumer that the purchased item is eligible for the delivery service (i.e., the point of sale computer will have access to product eligibility data). The sales person can inquire as to whether the consumer is enrolled in the delivery service program. If the consumer is not enrolled, the sales person can assist the consumer in enrolling in the delivery service program. The sales person can use a computer, e.g., the point of sale computer, to interact with system 250 for this purpose. If the consumer is already a member, the merchant will need to authenticate the consumer. This can be accomplished in a variety of different ways. For example, subscribers to the delivery service may hold a card containing identification and authentication information that can be scanned at the point of sale. Alternatively, subscribers may be provided some form of validation criteria (e.g., a PIN number or the like) to be inputted at the point of sale. Validation can be accomplished through communications with system 250. Thereafter, delivery can be arranged using the delivery service program, as described herein with regard to purchases made in the on-line environment.

Additionally, subscribers to the service may receive unique in-store offers. For example, members may be receive a discount on items purchased in-store in addition to the discounted (e.g., free) shipping for an item that is a gift or out-of-stock.

For phone orders, in one embodiment, the consumer may visit a web site of the service provider 200, log in to the program, and have a one-time use password generated. The one-time use password may then be used to take advantage of free delivery for products purchased from merchants 300 over the phone.

As is apparent from the foregoing description, the architecture of the computer system that supports the delivery service program is designed such that any merchant can offer the delivery service program to its consumers, using the systems of the service provider, regardless of the technology or platform used by such merchant for e-commerce, order management and fulfillment. In particular, the integration with and interaction between the systems of the service provider and the merchant members are simplified and minimized. Further, the points of integration between the systems of the service provider and merchant do not rely on the particular technology used by the merchant.

In some embodiments, consumers will receive benefits for referring others to the delivery service program. With reference to FIG. 2Z, a screen illustrating an exemplary embodiment is shown. The benefit received by the referring consumer may take the form of a check, a stored value card (i.e., which can be used to make purchases on any merchant member site), or a merchant-specific gift card.

By enrolling in the delivery service program, consumers may receive the additional benefit of a process that allows for expedited purchasing of products from multiple member merchants. For example, the prevailing check out process typically involves a number of steps: add item to cart; review cart; enter shipping address; select shipping method; enter payment information; review order; and confirm order. One aspect of the delivery service program serves to significantly reduce the number of steps required to purchase a product. In particular, the consumer may be able to select a product for purchase from the product detail page (i.e., by selecting a "Buy Now" button or other similar icon or designator) or the cart page, confirm his desire to make the purchase, and receive confirmation of the purchase.

Figure 4A:
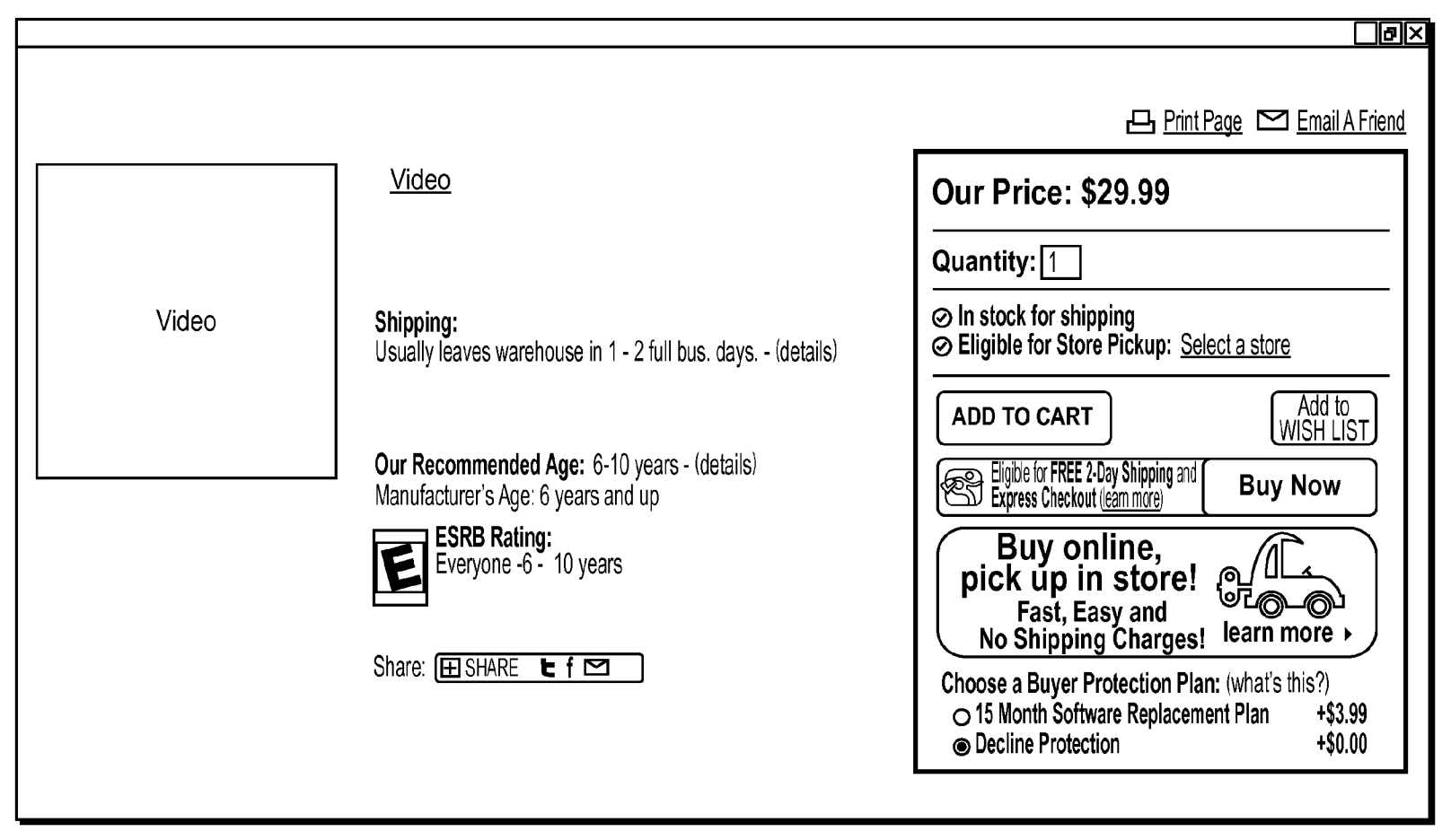

Thus, for example, with reference to FIG. 4A, for consumers who are enrolled in the delivery service program, the product detail page for a product (or cart page of items identified for purchase by the consumer) may include messaging indicating that the product is eligible for delivery using the delivery service program and a "Buy Now" button. The product detail page is, in general, the primary page on which the product is described and offered for sale. Typically, the product detail page includes an option for the consumer to add the item to his or her cart. The cart page is one which identifies all of the items the consumer has indicated a desire to purchase during his session. The "Buy Now" button may be included by any of the plurality of merchant member on the product detail page of products, or the cart page, as desired, thereby enabling the consumer to take advantage of expedited purchasing, and delivery in accordance with the delivery service program, from any of multiple merchants.

Figure 4B:
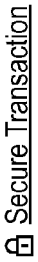
Figure 4C:
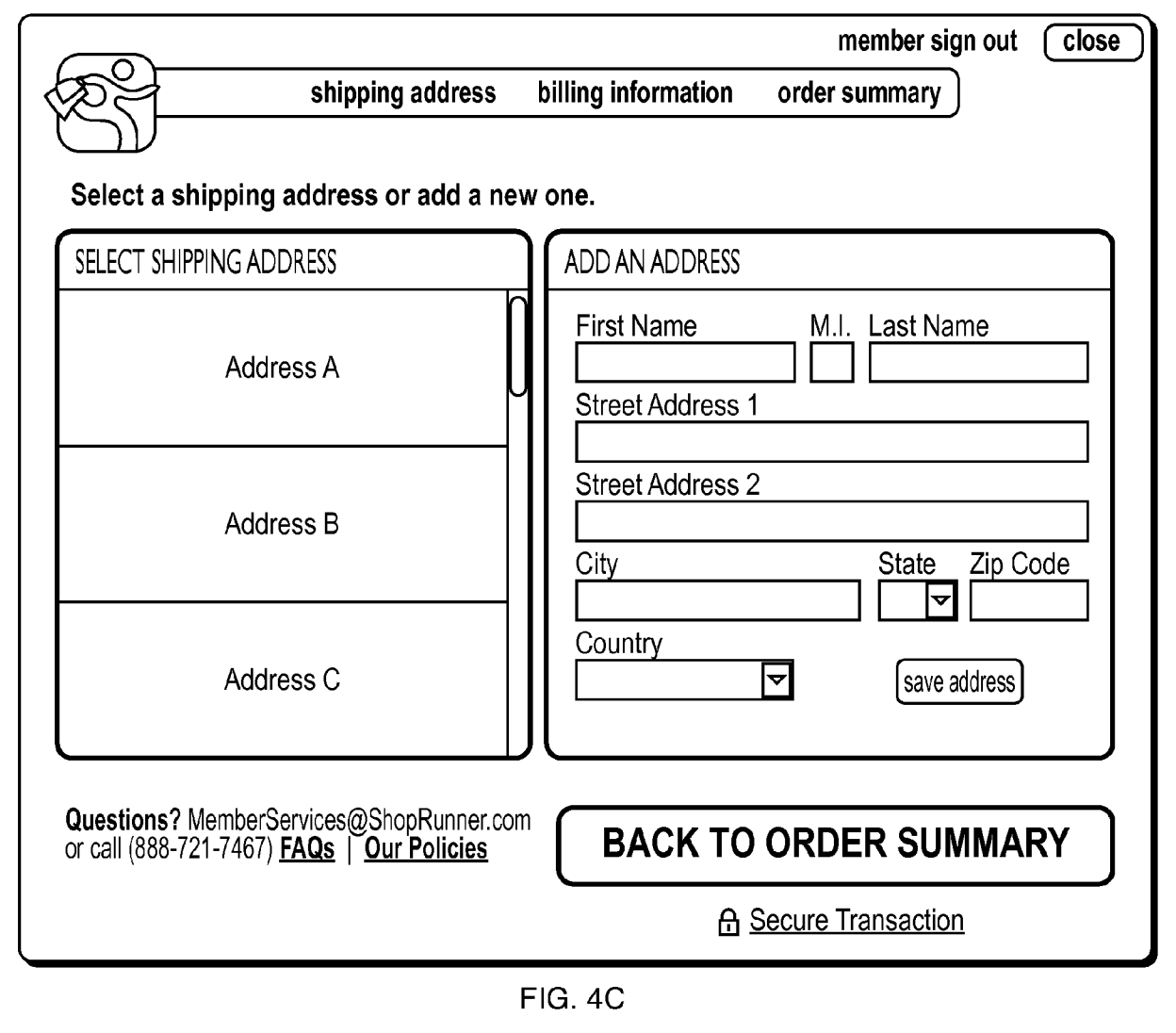
Figure 4D:
Figure 4E:
Figure 5:
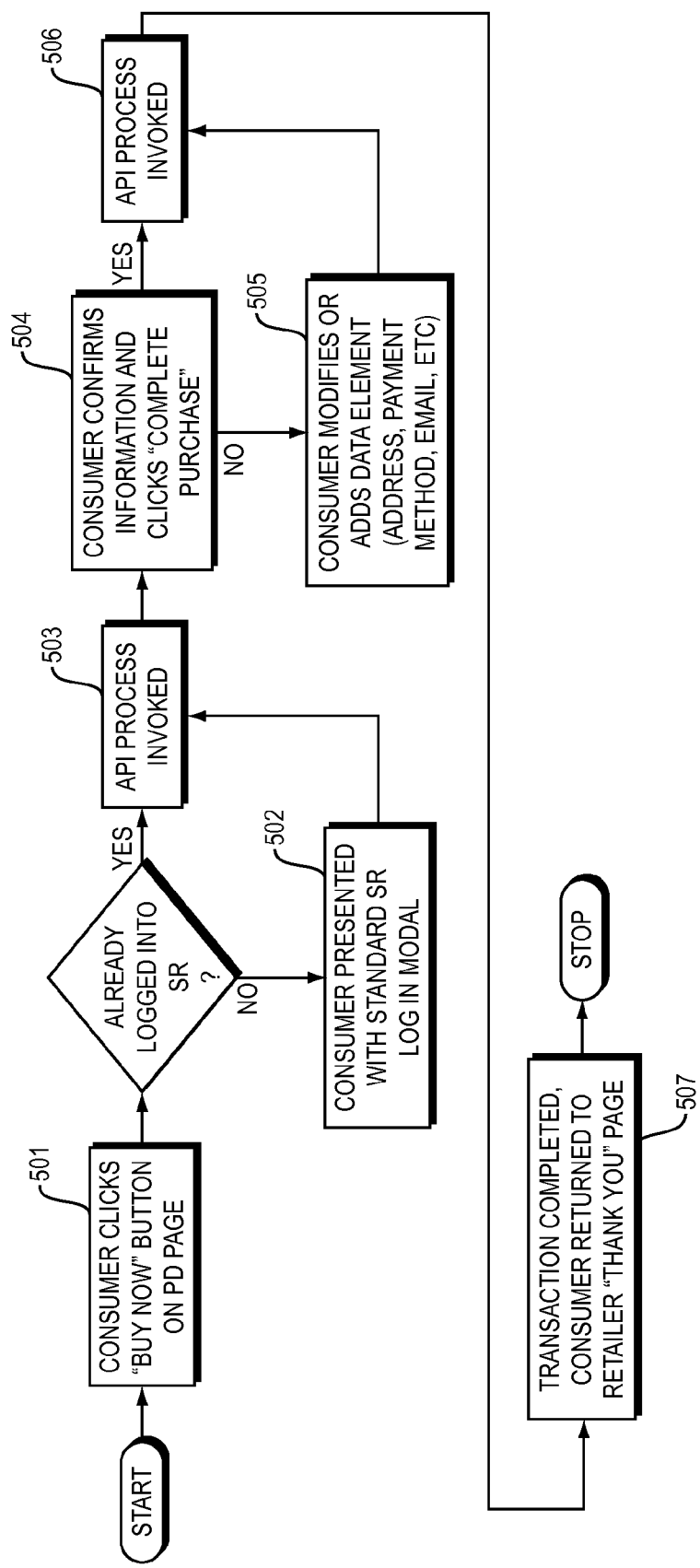
FIG. 5 is a diagram illustrating an exemplary process for making a purchase in accordance with one embodiment of the present invention.

Upon selecting the "Buy Now" button, step 501 of FIG. 5, the consumer may log in to the delivery service program, in step 502 of FIG. 5, if not already logged in. Upon logging in, or if previously logged in, an API process is invoked (described in more detail below), in step 503, pursuant to which all of the consumer's information and preferences, previously provided in connection with enrolling in the delivery service program, is retrieved from system 250 sent directly to the, merchant 300. Such information may include shipping address information, billing address information, payment information, and/or shipping preferences (e.g., using the delivery service program described herein). The merchant then calculates certain variables based on the information (e.g., sales tax) and returns information to the browser as shown in FIG. 4B. The consumer may confirm the information and indicate that he wants to complete the purchase, in step 504. Alternatively, the consumer may first select or enter alternative or additional payment and address information into the window, in step 505 (see FIGS. 4C, 4D and 4E), prior to indicating that he wants to complete the purchase. Such alternatives are stored in system 250. Thus, the consumer's information and preferences are available to and usable by the consumer, regardless of the merchant member from whom the purchase is to be made. Upon indicating he wants to complete the purchase, an API process is invoked (described in more detail below), in step 506, in which the merchant processes the purchase information, using the consumer's preference information. Thereafter, the order is shown as approved in step 507. The consumer is then re-directed to the merchant's native "Thank You" page.

The API process may be implemented in several ways, including the three alternatives described below. In one exemplary embodiment, the "Buy Now" and "Complete Purchase" buttons are represented by code, which reads the session identifier and passes the session identifier to system 250. System 250 then calls the Web Service URL of the merchant, providing the consumer's preference information (e.g., shipping address, billing address, payment method, shipping preference), and information about the purchase, to the merchant. In another embodiment, the merchant creates a page within its domain that contains the information required for checkout. Upon the consumer clicking the "Buy Now" and "Complete Purchase" buttons, the code representing the button sends the data from system 250 including the consumer's preference information, and information about the purchase, and populates the merchant page. The page is also populated with the session related information by the retailer when it is loaded. A server to server process is also implemented for the purpose of requesting and sending encrypted payment information from system 250 to the merchant. In a third option, the merchant builds a java script function that is invoked when the consumer clicks the "Buy Now" and "Complete Purchase" buttons. This function stores session information (i.e., order details) and passes the information to the code which, in turn, passes the information to system 250. As in the first example, system 250 makes a Web Service call to the merchant providing the consumer's preference information.

It will be appreciated by those skilled in the art that changes could be made to the examples and various embodiments described above without departing from the broad inventive concept thereof. It is understood, therefore, that this invention is not limited to the particular examples and embodiments disclosed, but it is intended to cover modifications within the spirit and scope of the present invention as defined by the appended claims.

What is claimed is:

1. A system comprising:
   memory operable to store at least one program; and
   at least one processor communicatively coupled to the memory, in which the at least one program, when executed by the at least one processor, causes the at least one processor to:
   access and process data received from one of a plurality of merchants, said data comprising an order to purchase from the merchant by a user one or more products pursuant to a service that provides the user with a discounted delivery cost on multiple products purchased by the user during a time period from any of the plurality of merchants, at least some of the plurality of merchants offering products for sale by way of a plurality of different sales channels; and
   access and process data received from the one of the plurality of merchants, said data comprising information regarding delivery of the one or more products pursuant to the service.

2. The system of claim 1 wherein the discounted delivery cost comprises a free delivery cost.

3. The system of claim 1 wherein the discounted delivery cost applies to an unlimited number of purchases made by the user during the time period.

4. The system of claim 1 wherein the discounted delivery cost is applicable to purchases made by one or more individuals in a household of the user.

5. The system of claim 1 wherein the service includes a discounted delivery cost for returns of products purchased using the service.

6. The system of claim 5 wherein the discounted delivery cost for returns comprises a free delivery cost for returns.

7. The system of claim 1 wherein the at least one processor is further caused to:
   access and process data received from each of the plurality of merchants, said data comprising a list of products eligible for the discounted delivery cost pursuant to the service.

8. The system of claim 1 wherein the service is promoted in connection with products that are eligible for the discounted delivery cost on a web site of at least one of the plurality of merchants in one or more locations prior to or on a cart page displayed by the merchant.

9. The system of claim 8 wherein the promotion comprises an opportunity to purchase a product using the service.

10. The system of claim 1 wherein the order to purchase is initiated from an on-line store of the merchant.

11. The system of claim 1 wherein the order to purchase is initiated from a physical store of the merchant.

12. A computer-readable storage medium that stores instructions which, when executed by one or more processors cause the one or more processors to perform a method comprising:
    accessing and processing data received from one of a plurality of merchants, said data comprising an order to purchase from the merchant by a user one or more products pursuant to a service that provides the user with a discounted delivery cost on multiple products purchased by the user during a time period from any of the plurality of merchants, at least some of the plurality of merchants offering products for sale by way of a plurality of different sales channels; and
    accessing and processing data received from the one of the plurality of merchants, said data comprising information regarding delivery of the one or more products pursuant to the service.

13. The computer-readable storage medium of claim 12 wherein the discounted delivery cost comprises a free delivery cost.

14. The computer-readable storage medium of claim 12 wherein the discounted delivery cost applies to an unlimited number of purchases made by the user during the time period.

15. The computer-readable storage medium of claim 12 wherein the discounted delivery cost is applicable to purchases made by one or more individuals in a household of the user.

16. The computer-readable storage medium of claim 12 wherein the service includes a discounted delivery cost for returns of products purchased using the service.

17. The computer-readable storage medium of claim 16 wherein the discounted delivery cost for returns comprises a free delivery cost for returns.

18. The computer-readable storage medium of claim 12 wherein the method further comprises:
    accessing and processing data received from each of the plurality of merchants, said data comprising a list of products eligible for the discounted delivery cost pursuant to the service.

19. The computer-readable storage medium of claim 12 wherein the service is promoted in connection with products that are eligible for the discounted delivery cost on a web site of at least one of the plurality of merchants in one or more locations prior to or on a cart page displayed by the merchant.

20. The computer-readable storage medium of claim 19 wherein the promotion comprises an opportunity to purchase a product using the service.

21. The computer-readable storage medium of claim 12 wherein the order to purchase is initiated from an on-line store of the merchant.

22. The computer-readable storage medium of claim 12 wherein the order to purchase is initiated from a physical store of the merchant.

\* \* \* \* \*